United States Patent
Kooiker et al.

(10) Patent No.: US 12,415,242 B1
(45) Date of Patent: Sep. 16, 2025

(54) SYSTEM AND APPARATUS FOR WASTE MATERIAL COLLECTION FROM CUTTING MACHINE

(71) Applicants: Wes Kooiker, Doon, IA (US); Justin L. Vande Kamp, Hudson, SD (US); Chad Koenen, Rock Valley, IA (US)

(72) Inventors: Wes Kooiker, Doon, IA (US); Justin L. Vande Kamp, Hudson, SD (US); Chad Koenen, Rock Valley, IA (US)

(73) Assignee: Kooima Company, Inc, Rock Valley, ME (US)

( * ) Notice: Subject to any disclaimer, the term of this patent is extended or adjusted under 35 U.S.C. 154(b) by 410 days.

(21) Appl. No.: 17/749,396

(22) Filed: May 20, 2022

(51) Int. Cl.
*B23Q 11/00* (2006.01)

(52) U.S. Cl.
CPC .................. *B23Q 11/0067* (2013.01)

(58) Field of Classification Search
CPC ............ B23Q 11/0042; B23Q 11/0067; B65D 88/56; B65G 65/23; B66F 9/19; B65F 1/122; B65F 3/26
See application file for complete search history.

(56) References Cited

U.S. PATENT DOCUMENTS

| | | | | |
|---|---|---|---|---|
| 3,430,767 A | * | 3/1969 | Skirvin | B23Q 11/0042 210/167.01 |
| 9,902,558 B2 | * | 2/2018 | Genter | B65D 88/56 |

\* cited by examiner

*Primary Examiner* — Andrew T Kirsch
(74) *Attorney, Agent, or Firm* — Jeffrey A. Proehl; Woods, Fuller, Shultz & Smith, PC

(57) ABSTRACT

A system for collecting and disposing waste from a material cutting machine may include a tray apparatus at least partially insertable into the cutting machine. The tray apparatus has an interior and an open top for receiving waste from the cutting machine. The tray apparatus may have a collection condition for holding waste in the interior and a disposal condition for dumping waste from the interior. The tray apparatus may include a base structure and a pan structure movably mounted on the base structure to move between a collection position and a disposal position. The tray apparatus may define a pair of fork pockets with each fork pocket being configured to receive a portion of a lift fork to facilitate lifting of the tray apparatus by equipment having lift forks.

16 Claims, 7 Drawing Sheets

SYSTEM AND APPARATUS FOR WASTE MATERIAL COLLECTION FROM CUTTING MACHINE

BACKGROUND

Field

The present disclosure relates to waste material collection apparatus and more particularly pertains to a new system and apparatus for waste material collection from a cutting machine which may also facilitate disposal of material from the apparatus.

SUMMARY

In one aspect, the present disclosure relates to a system for collecting and disposing waste from a material cutting machine. The system may comprise a waste collection and disposal tray apparatus at least partially insertable into the material cutting machine to receive descending waste. The tray apparatus may have an interior for receiving waste from the material cutting machine, and an open top and a bottom opposite of the open top. The tray apparatus may have a collection condition characterized by the tray apparatus being configured to hold waste and a disposal condition characterized by the tray apparatus being configured to dump waste from the tray apparatus. The tray apparatus may comprise a base structure and a pan structure. In embodiments, the pan structure may be movably mounted on the base structure to move between a collection position corresponding to the collection condition and a disposal position corresponding to the disposal condition. In embodiments, the tray apparatus may define a pair of fork pockets with each fork pocket being configured to receive a portion of a lift fork to facilitate lifting of the tray apparatus by equipment having lift forks.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
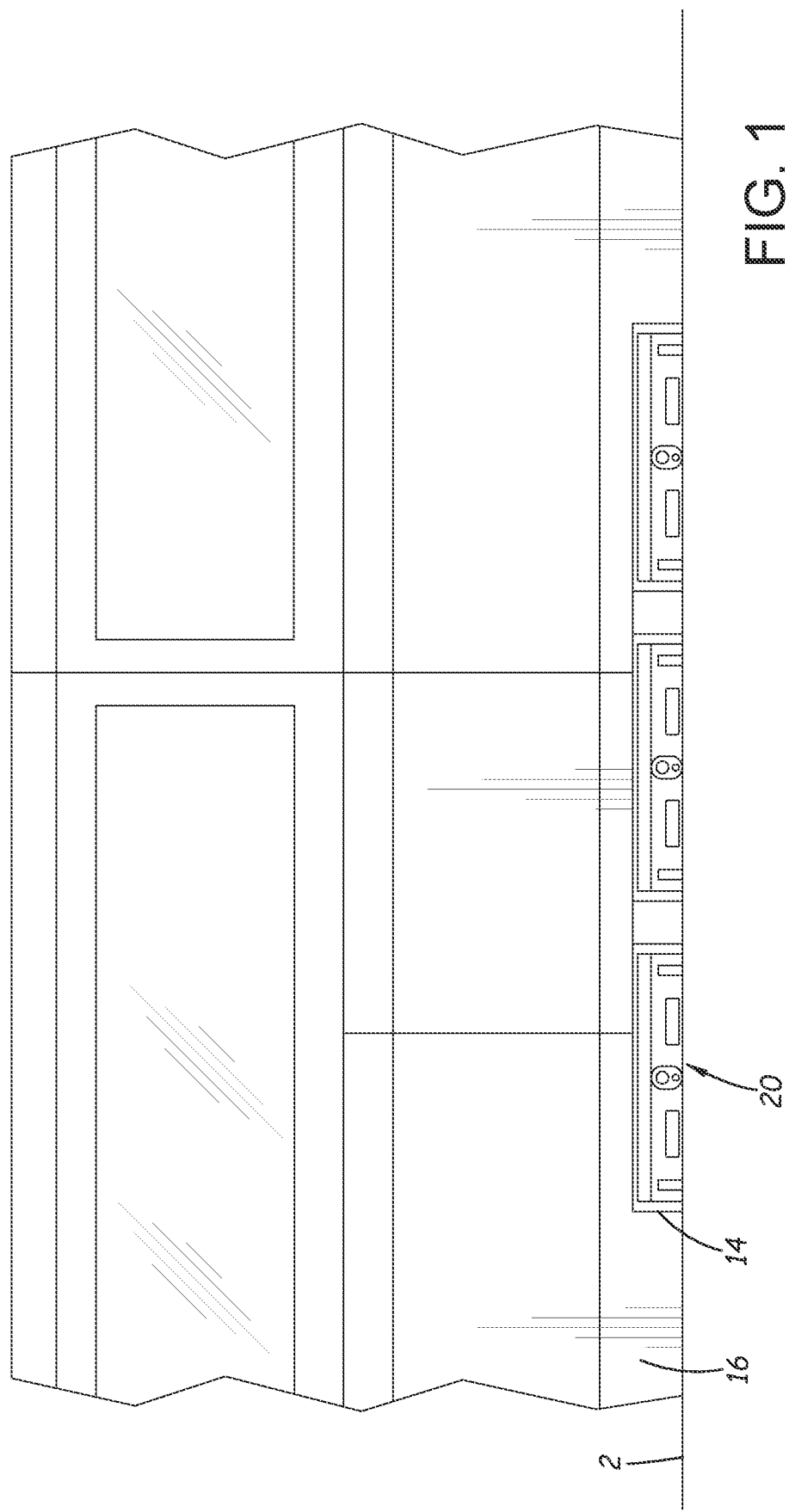
FIG. 1 is a schematic perspective view of a new system and apparatus for waste material collection from a cutting machine according to the present disclosure.
Figure 2:
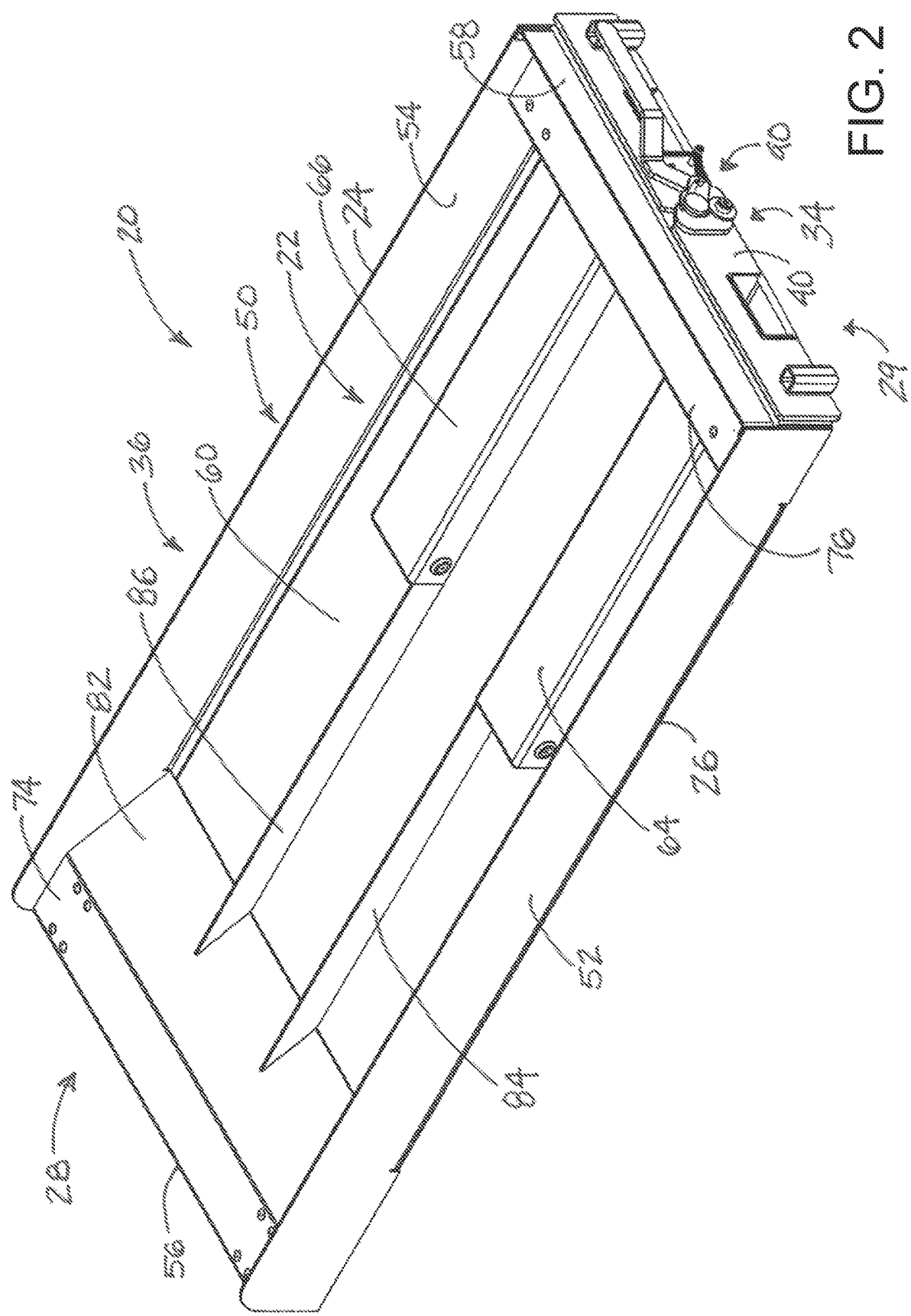
FIG. 2 is a schematic upper perspective view of a tray apparatus of the system in the collection condition with the pan structure in the collection position, according to an illustrative embodiment.

With reference now to the drawings, and in particular to FIGS. 1 through 7 thereof, a new system and apparatus for waste material collection from a cutting machine embodying the principles and concepts of the disclosed subject matter will be described.

Cutting machinery, such as machinery for cutting metal sheet or plate, generates waste or other debris by the material that is cut away (e.g., slugs) as well as the material that melts during the cutting operation and then solidifies upon cooling (e.g., slag). The cutting machinery typically has some means for removing the waste from the machine, such as rudimentary trays, but the trays can be difficult and laborious to clear of waste, particularly the waste that has re-solidified in the tray and may adhere together pieces of the cut away material. Breaking up of amalgamations with a pry bar, and manual picking of the pieces out of the tray is not uncommon to empty the tray.

The applicants have recognized that the original equipment waste collection tray may be improved by including structure that facilitates the lifting of tray with equipment such as a fork lift would be beneficial, and may be even more advantageous if the collection tray is able to provide a waste dumping action when the tray is lifted into an elevated positon above a scrap material dumpster.

In one aspect, the disclosure relates to a system 1 for removing waste or unneeded portions of a material from other portions of the material to be further processed or utilized. One example of such a system is a material cutting system which cuts material, such as a metal is in the form of a sheet or plate, by means of heat using, for example, laser cutting, plasma cutting, flame cutting or plasma cutting. Such cutting technologies typically generate waste not only from the unused or unneeded portions of sheet or plate material cut away from the usable portions of material, but also the molten portions of the material which eventually cool and harden into irregular waste. Cutting systems are typically positioned in an enclosed building structure and fully or partially rest on a floor surface 2.

In some aspects, the system 1 may include a material cutting machine 10 which is configured to cut material using one of the disclosed technologies or other suitable technology, and operation of the cutting machine 10 may produce waste pieces of the material, typically in the form of cut away material or material bowled by the process that falls away from the cutting plane. Illustratively, the cutting machine 10 may have a peripheral wall 12 which may extend generally upwardly from the floor surface 2. Machines 10 which are highly suitable for implementing elements of the disclosure may define at least one collecting space 14 which is located below cutting plane of the machine, and often may be located below the cutting machine. In some of the illustrative implementations, the cutting machine 10 is positioned on the floor surface 2 and one or more collecting spaces 14 are at least partially defined by the floor surface. An opening or aperture 16 may be formed in the peripheral wall 12 of the cutting machine and may be in communication with the collecting space or spaces 14 in order to provide access to the space 14. The aperture 16 may be at least partially defined by the floor surface 2 so that a portion of the aperture is at floor level.

In some aspects, the system 1 may include a waste collection and disposal tray apparatus 20 for collecting waste material from the material cutting machine 10, although in some implementations the disclosure is directed to the tray apparatus alone. The tray apparatus 20 may be removably positionable in the collecting space 14 of the cutting machine at a location which permits the apparatus 22 receive waste material generated during the cutting operation, usually by operation of gravity on the unsupported waste portions of the material.

In greater detail, the tray apparatus 20 may have an interior 22 for receiving waste falling or dropping from the raw material placed in the cutting machine such as on the cutting plane. The tray apparatus 20 typically has an open top 24 through which waste falling from cutting operations passes into the interior 22 of the tray apparatus 20, and also has a bottom 26 on which the waste in the interior 22 rests. The bottom 26 is located opposite of the open top 24. The tray apparatus 20 may be elongated, and have an inboard end 28 and an outboard end 29, with the inboard end being inserted through the aperture 16 when the tray apparatus is moved into the collecting space 14 of the machine 10.

Figure 3:
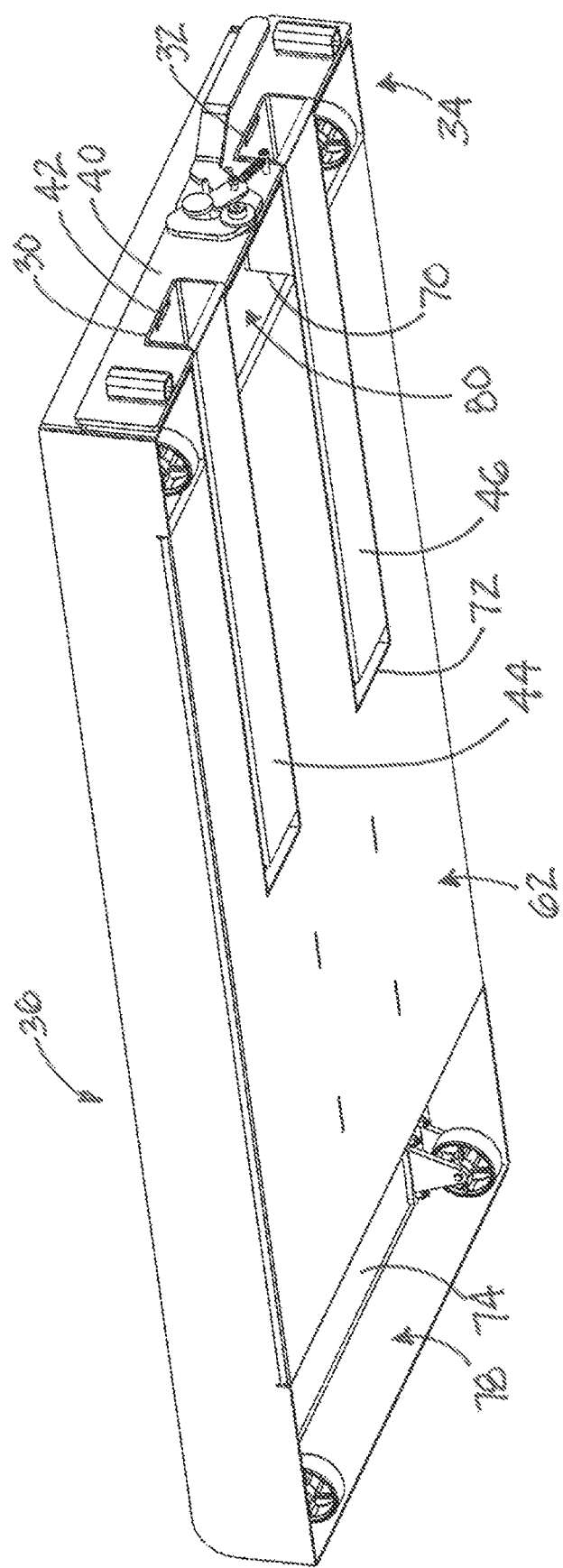
FIG. 3 is a schematic lower perspective view of the tray apparatus in the collection condition with the pan structure in the collection position, according to an illustrative embodiment.
Figure 4:
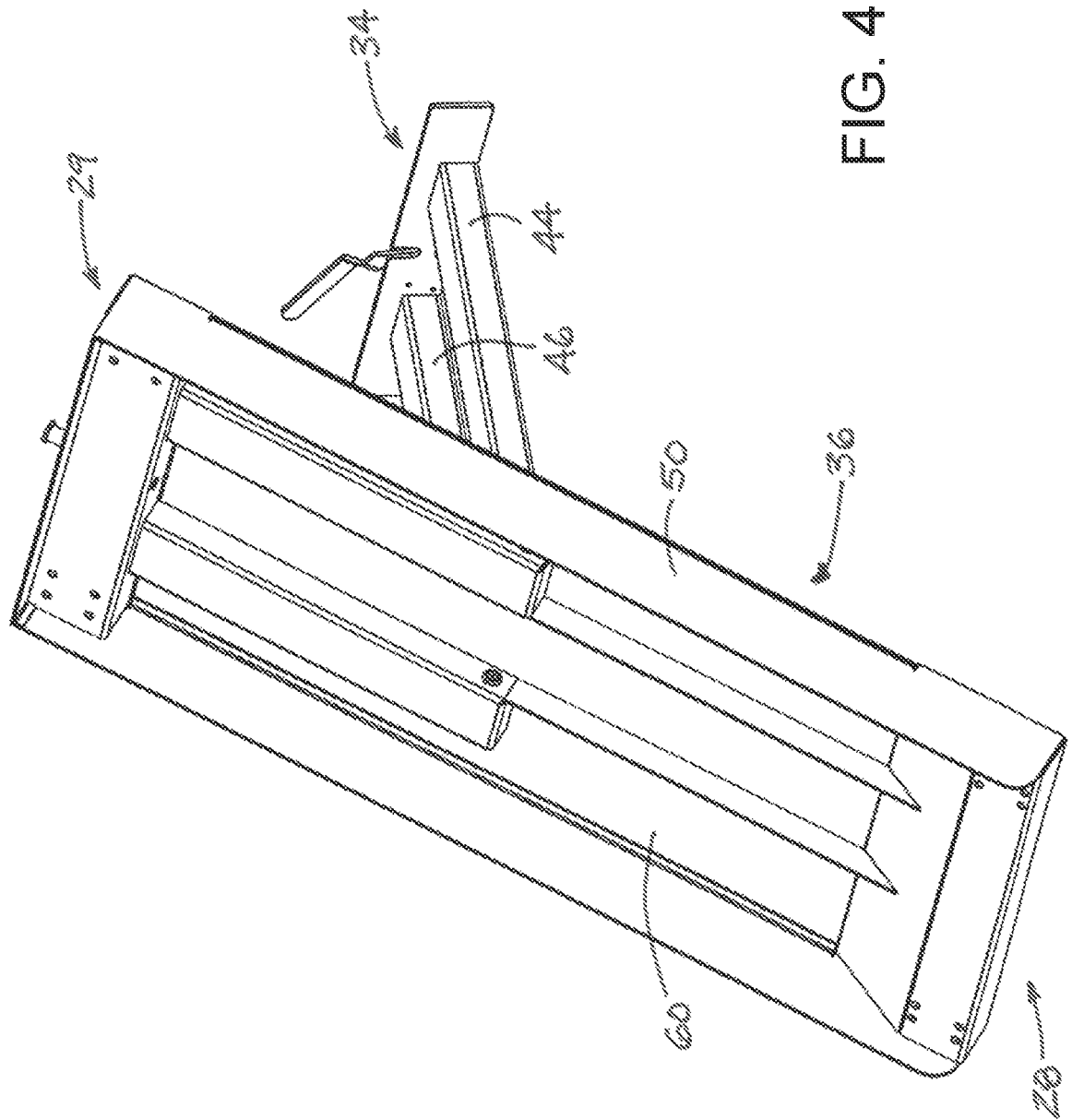
FIG. 4 is a schematic first perspective view of the tray apparatus in the disposal condition with the pan structure in the disposal position, according to an illustrative embodiment.
Figure 5:
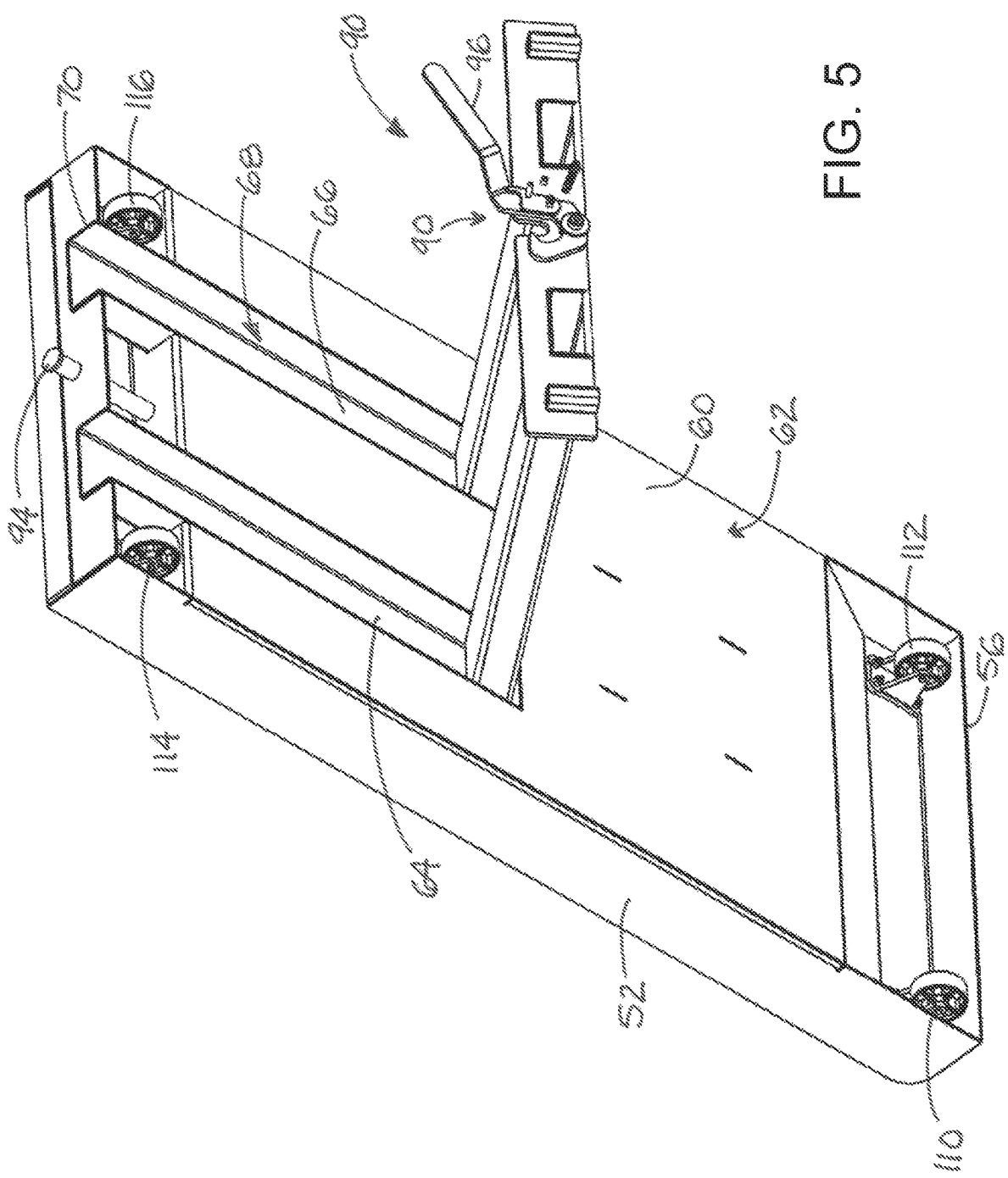
FIG. 5 is a schematic second perspective view of the tray apparatus in the disposal condition with the pan structure in the disposal position, according to an illustrative embodiment.
Figure 6:
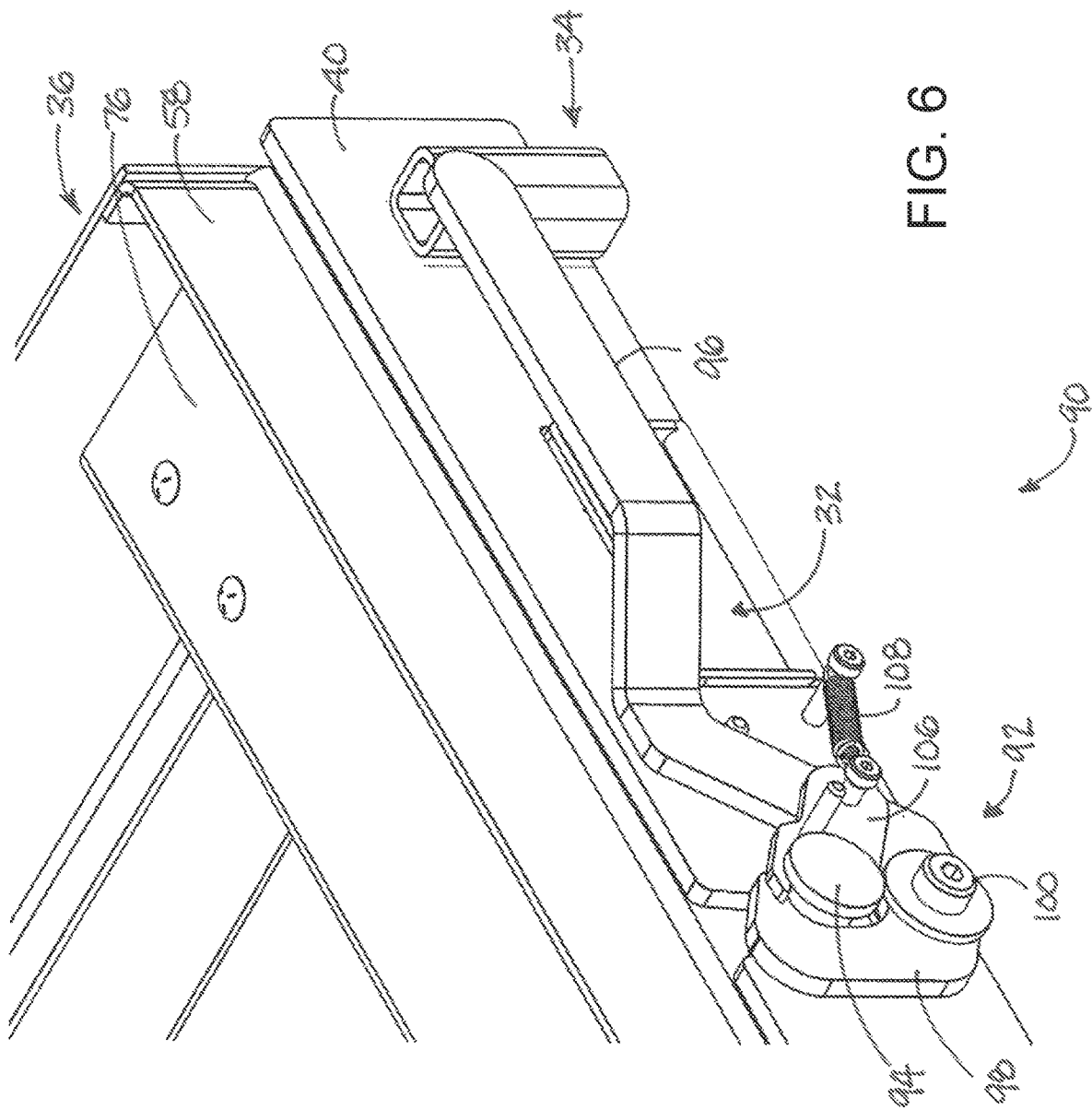
FIG. 6 is a schematic perspective view of a portion of the tray apparatus showing the latch assembly in the latched condition, according to an illustrative embodiment.
Figure 7:
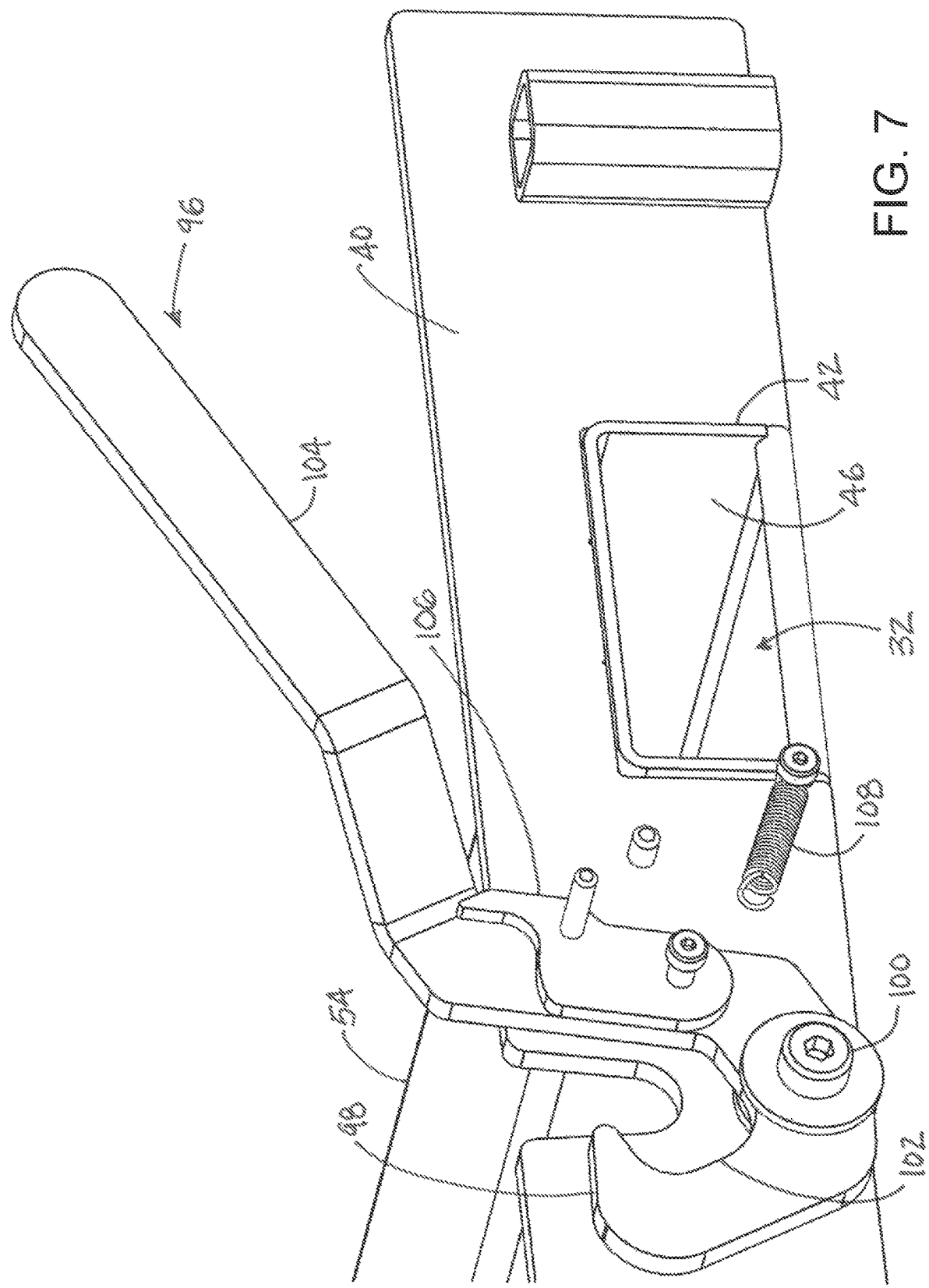
FIG. 7 is a schematic perspective view of a portion of the tray apparatus showing the latch assembly in the unlatched condition, according to an illustrative embodiment.

In some of the most significant implementations of the disclosure, the tray apparatus 20 has a collection condition (see, e.g., FIGS. 1 and 2) and a disposal condition (see, e.g., FIGS. 3 and 4). The collection condition of the tray apparatus may be characterized by the apparatus 20 being configured to hold waste pieces of material, and the disposal condition may be characterized by the tray apparatus being configured to dump or dispense or otherwise empty waste from the apparatus 20. Also, another feature, which is highly useful in combination with the conditions of the tray apparatus, is a pair of fork pockets 30, 32 that are formed by the apparatus 20. The fork pockets 30, 32 provide a place of insertion of a portion of a lift fork so that a fork or forks of equipment, such as a forklift, may be utilized to lift and lower the tray apparatus with respect to the floor surface, particularly when waste material is desired to be dumped or emptied from the interior 22 of the apparatus 20.

In general, the tray apparatus 20 may comprise a base structure 34 and a pan structure 36. The pan structure 36 is mounted on the base structure 34, and is movable with respect to the base structure. The pan structure 36 may be movable between a collection position (see, e.g., FIGS. 1 and 2) and a disposal position (see, e.g., FIGS. 3 and 4) with respect to the base structure. The collection position of the pan structure 36 may be characterized by the pan structure having an orientation extending substantially parallel to the base structure 34. The disposal condition may be characterized by the pan structure having an orientation which is rotated or tilted with respect to the base structure out of the collection position, and may feature the pan structure being angled with respect to the base structure. In some preferred embodiments, the pan structure 36 is pivotally mounted on the base structure 34 at a pivot joint. Illustratively, the pan structure 36 is pivotable on the base structure 34 at a location that is medial of the inboard 28 and outboard 29 ends of the tray apparatus.

In some embodiments, the base structure 34 may include a base wall 40 which is located at the inboard end 29 of the tray apparatus, and may have an entry opening 42 for each of the fork pockets. The base structure 34 may further include a pair of pocket forming elements 44, 46 which each form one of the fork pockets 30, 32. Each of the pocket forming elements 44, 46 may be tubular to receive a fork of lifting equipment, each element 44, 46 may be associated with one of the entry openings 42 in the base wall 40.

In embodiments, the pan structure 36 may include a perimeter wall 50 which extends from the bottom 26 to the open top 24 of the tray apparatus, and about the interior 22. The perimeter wall 50 may have opposite side portions 52, 54 and opposite end portions 56, 58. Illustratively, the perimeter wall 50 may be substantially rectangular in shape. The pan structure 36 may further include a bottom wall 60 which extends across at least a portion of the bottom of the tray apparatus to generally close the bottom of the interior 22. The bottom wall 60 may have an underside 62 oriented opposite of the open top 24.

In some embodiments, the bottom wall 50 may include a pair of inverted channel sections 64, 66, with each of the inverted channel sections defining a channel 68 on the underside 62 of the bottom wall for receiving one of the respective pocket forming elements 44, 46 of the base structure. Each of the inverted channel sections 64, 66 may extend from the inboard end 28 of the tray apparatus 20 toward the outboard end 29 of the apparatus, and each of the inverted channel sections may extend from an open end 70 at the inboard end to a blind end 72 opposite of the open end, which may be generally medial between the inboard and outboard ends.

The bottom wall 50 may further include a plurality of cavity forming sections 74, 76 with each of the cavity forming sections defining a cavity 80 on the underside 62 of the bottom wall. Each of the cavity forming sections 74, 76 may be located toward one of the ends of the tray apparatus, with one of the cavities being an inboard cavity 78 and another one of the cavities being an outboard cavity 80. In some embodiments, the outer cavity forming section 76 may include an inclined section 82 located toward the outboard end of the pan structure, and the upper surface of the inclined section may be inclined upward from the bottom 26 to the open top 24 at the outboard end of the pan structure to facilitate movement of waste hold of the interior 22 of the apparatus 20, particularly when the tray apparatus is moved from the collection condition to the disposal condition.

Optionally, the pan structure 36 may include at least one rib 84 which extends upwardly from the bottom wall 60 toward the open top 24. Illustratively, the rib 84 may extend substantially parallel to the side portions 52, 54 of the perimeter wall, and may extend from one of the inverted channel sections 64, 66 of the bottom wall to the inclined section 82 of the bottom wall. In some referred embodiments, a pair of the ribs 84, 86 are provided and are laterally spaced from each other, and the cited portions 52, 54, in the interior 22 of the tray apparatus.

The tray apparatus 20 may further include a securing mechanism 90 which is configured to secure the base structure 34 and the pan structure 36 in the collection position. In some embodiments, the securing mechanism 90 may comprise a latch assembly 92 which is movable between a latched condition (see, e.g., FIG. 6) and an unlatched condition (see, e.g., FIG. 7), with the latched condition being characterized by the assembly 92 securing the base 34 and pan 36 structures in the collection position and the unlatched condition being characterized by the assembly 92 permitting the pan structure 36 to move with respect to the base structure 34 into the disposal position.

In the illustrative embodiments, the latch assembly 92 includes a latch post 94 which is mounted on the pan structure and extends or protrudes from the inboard end of the pan structure. The latch assembly 92 may include a latch member 96 for selectively engaging the latch post 94. The latch member 96 may be mounted on the base structure, such as on the base wall 40 of the base structure. The latch member is movable with respect to the base structure between a latched position (see, e.g., FIG. 6) corresponding to the latch condition and an unlatched position (see, e.g., FIG. 7) corresponding to the unlatched condition of the securing mechanism. The latch member 96 may include a hook portion 98 forming a hook to engage the latch post 94, and the hook portion may be fastened by a fastener 100 to the base structure in a manner such that the hook portion is pivotable on the fastener. The hook portion 98 may have a throat 102 for receiving a portion of the latch post 94. The latch member 96 may also include a handle portion 104 which extends from the hook portion 98 to provide a handhold with enhanced leverage for moving the latch member.

The latch assembly 92 may also include a lock member 106 for selectively locking the latch member 96 in the latched position. The lock member 106 may be pivotally mounted on the hook portion 98, and may have a locked position (see, e.g., FIG. 6) and an unlocked position (see, e.g., FIG. 7). The locked position may be characterized by the lock member blocking movement of the latch post 94 out of the throat 102 of the hook portion. The unlocked position may be characterized by the lock member 106 being positioned so as not to lock movement of the latch post out of the throat of the hook portion. Additionally, the latch assembly may include a biasing element 108 which is configured to bias the movement of the latch member 96 toward the latched position, and illustratively may comprise a tension spring.

The tray apparatus 20 may further include a plurality of wheel assemblies 110, 112, 114, 116 which are configured to facilitate movement of the apparatus 20 across the floor surface 2, particularly when the tray apparatus is to be moved into our out of the collecting space 14 of the machine 10. The wheel assemblies 110, 112, 114, 116 may be mounted on the pan structure 36, and may be located on the underside 62 of the bottom wall of the pan structure. Each of the wheel assemblies may be positioned in one of the cavities 78, 80 on the underside of the bottom wall, and may be arranged such that a wheel assembly is located toward each of the corners of the pan structure.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

We claim:

1. A system for collecting and disposing waste from a material cutting machine, the system comprising:
    a waste collection and disposal tray apparatus at least partially insertable into the material cutting machine to receive descending waste, the tray apparatus having an interior for receiving waste from the material cutting machine, the tray apparatus having an open top and a bottom opposite of the open top, the tray apparatus having a collection condition characterized by the tray apparatus being configured to hold waste and a disposal condition characterized by the tray apparatus being configured to dump waste from the tray apparatus, the tray apparatus comprising:
        a base structure; and
        a pan structure;
        wherein the pan structure is pivotally mounted on the base structure at a pivot joint connection to permit the pan structure to pivot with respect to the base structure to move between a collection position corresponding to the collection condition and a disposal position corresponding to the disposal condition;
    wherein the tray apparatus defines a pair of fork pockets with each fork pocket being configured to receive a portion of a lift fork to facilitate lifting of the tray apparatus by equipment having lift forks.

2. The system of claim 1 wherein the collection position of the tray apparatus is characterized by the pan structure extending substantially parallel to the base structure and the disposal condition of the tray apparatus is characterized by the pan structure being rotated with respect to the base structure out of the collection position.

3. The system of claim 2 wherein the disposal condition of the tray apparatus is characterized by the pan structure being angled with respect to the base structure.

4. The system of claim 1 wherein the base structure includes a pair of pocket forming elements each forming one of the fork pockets, each of the pocket forming elements being tubular.

5. The system of claim 4 wherein the base structure includes a base wall having an entry opening formed therein which is associated with each of the fork pockets.

6. The system of claim 4 wherein the pan structure includes a bottom wall and a perimeter wall extending upwardly from the bottom wall toward the open top, the bottom wall having an underside; and
wherein the bottom wall includes a pair of inverted channel sections, each of the inverted channel sections defining a channel on the underside of the bottom wall for receiving one of the pocket forming elements of the base structure.

7. The system of claim 1 wherein the pan structure includes a bottom wall defining a pair of channel sections each receiving at least a portion of a respective one of the fork pockets, each of the fork pockets being joined to a respective one of the channel sections by a said pivot joint connection, each of the pivot joint connections being located in the respective channel section.

8. The system of claim 1 wherein the pivot joint connection of the pan structure and the base structure is located at a fixed location medial of inboard and outboard ends of the tray apparatus.

9. The system of claim 1 wherein the tray apparatus additionally includes a securing mechanism configured to secure the pan structure in the collection position with respect to the base structure.

10. The system of claim 9 wherein the securing mechanism comprises a latch assembly movable between a latched condition characterized by securing the pan structure in the collection position and an unlatched condition characterized by permitting the pan structure to move out of the collection position toward the disposal position.

11. The system of claim 1 wherein the pan structure includes a bottom wall and a perimeter wall extending upwardly from the bottom wall toward the open top, the bottom wall having an underside, the pan structure being elongated between opposite ends; and
wherein the bottom wall includes a plurality of cavity forming sections each forming a cavity on the underside of the bottom wall, each of the cavities being positioned toward one of the ends of the pan structure.

12. The system of claim 11 wherein the pan structure includes a plurality of wheel assemblies configured to facilitate movement of the tray apparatus across the floor surface, each of the wheel assemblies being positioned in one of the cavities on the underside of the bottom wall.

13. The system of claim 1 wherein the pan structure includes a bottom wall and a perimeter wall extending upwardly from the bottom wall toward the open top, the pan structure being elongated between opposite inboard and outboard ends;
wherein the bottom wall includes an inclined section, an upper surface of the inclined section being inclined upward from the bottom to the open top at the outboard end of the pan structure toward one end of the pan structure to facilitate movement of waste out of the interior of the tray apparatus when the pan structure is moved from the collection position toward the disposal position.

14. A system for collecting and disposing waste from a material cutting machine, the system comprising:
a waste collection and disposal tray apparatus at least partially insertable into the material cutting machine to receive descending waste, the tray apparatus having an interior for receiving waste from the material cutting machine, the tray apparatus having an open top and a bottom opposite of the open top, the tray apparatus having a collection condition characterized by the tray apparatus being configured to hold waste and a disposal condition characterized by the tray apparatus being configured to dump waste from the tray apparatus, the tray apparatus comprising:
a base structure having a pair of fork pockets with each fork pocket being configured to receive a portion of a lift fork to facilitate lifting of the tray apparatus by equipment having lift forks; and
a pan structure, a pivot joint connection pivotally mounting the pan structure on the base structure to permit the pan structure to pivot with respect to the base structure to move between a collection position corresponding to the collection condition and a disposal position corresponding to the disposal condition;
wherein the pan structure forms a pair of channels on an underside of the pan structure, each of the channels receiving one of the fork pockets when the pan structure is in the collection position, each of the fork pockets being pivoted substantially out of a respective channel when the pan structure is in the disposal position.

15. The system of claim 14 wherein the pivot joint connection connects each of the fork pockets of the base structure to a respective one of the channels formed by the pan structure.

16. A system for collecting and disposing waste from a material cutting machine, the system comprising:
a material cutting machine configured to cut material, operation of the cutting machine producing waste pieces of the material, the cutting machine defining at least one collecting space located below the cutting machine; and
a waste collection and disposal tray apparatus at least partially inserted into the at least one collecting space of the material cutting machine to receive descending waste, the tray apparatus being removable from the at least one collecting space, the tray apparatus having an interior for receiving waste from the material cutting machine, the tray apparatus having an open top and a bottom opposite of the open top, the tray apparatus having a collection condition characterized by the tray apparatus being configured to hold waste and a disposal condition characterized by the tray apparatus being configured to dump waste from the tray apparatus, the tray apparatus comprising:
a base structure having a pair of fork pockets with each fork pocket being configured to receive a portion of a lift fork to facilitate lifting of the tray apparatus by equipment having lift forks; and
a pan structure, a pivot joint connection pivotally mounting the pan structure on the base structure to permit the pan structure to pivot with respect to the base structure to move between a collection position corresponding to the collection condition and a disposal position corresponding to the disposal condition;

wherein the pan structure forms a pair of channels on an underside of the pan structure, each of the channels receiving one of the fork pockets when the pan structure is in the collection position, each of the fork pockets being pivoted substantially out of a respective channel when the pan structure is in the disposal position.

\* \* \* \* \*